United States Patent [19]

Graf et al.

[11] Patent Number: 5,536,519
[45] Date of Patent: Jul. 16, 1996

[54] PREPARATION OF HIGH-IMPACT AND STABLE ENCAPSULATED FLAVORS FOR FROZEN OR REFRIGERATED DESSERTS AND PRODUCTS RESULTING THEREFROM

[75] Inventors: Ernst Graf; Johan P. van Leersum, both of Cincinnati, Ohio

[73] Assignee: Tastemaker, Cincinnati, Ohio

[21] Appl. No.: 176,832

[22] Filed: Jan. 3, 1994

[51] Int. Cl.⁶ ..................................... A23L 1/22
[52] U.S. Cl. ..................... 426/534; 426/98; 426/100
[58] Field of Search ................ 426/100, 98, 534, 426/533, 289, 290, 291, 292, 294, 295, 285, 99, 101

[56] References Cited

U.S. PATENT DOCUMENTS

| | | | |
|---|---|---|---|
| 3,389,000 | 6/1968 | Fujita | 426/99 |
| 3,672,917 | 6/1972 | Buchzik | 426/99 |
| 3,914,439 | 10/1975 | Graves | 426/98 |
| 4,086,367 | 4/1978 | Ziccarelli | 426/98 |
| 4,328,253 | 5/1982 | von Kamienski | 426/100 |
| 4,576,826 | 3/1986 | Liu | 426/98 |
| 4,634,598 | 1/1987 | Liu | 426/98 |
| 4,713,252 | 12/1987 | Ismail | 426/290 |
| 4,741,910 | 5/1988 | Karwowski | 426/285 |
| 4,822,627 | 4/1989 | Clegg | 426/294 |

*Primary Examiner*—Carolyn Paden
*Attorney, Agent, or Firm*—Wood, Herron & Evans

[57] ABSTRACT

This invention is directed to a method for preparing frozen flavor capsules as well as a method for incorporating these flavor capsules into low-fat frozen or refrigerated desserts. The invention also encompasses the capsules themselves, as well as dessert products incorporating these capsules. The capsules are prepared by first forming discrete composite capsules having a flavor encapsulated in an oil, and then freezing these capsules to solidify the oil and form discrete frozen solid flavor particles. Because the oil is essentially a liquid at ambient temperature, the oil liquifies in the mouth upon consumption, providing a balanced flavor release from, the previously protected flavor capsule.

20 Claims, No Drawings

PREPARATION OF HIGH-IMPACT AND STABLE ENCAPSULATED FLAVORS FOR FROZEN OR REFRIGERATED DESSERTS AND PRODUCTS RESULTING THEREFROM

BACKGROUND OF THE INVENTION

As consumers become more health conscious, they are demanding frozen desserts that are low in fat, yet great tasting. Historically, however, these two qualities have not gone together. The low-fat products have had a poor taste perception, while improved taste has come at the expense of increased fat. This is partly so because the fat stabilizes the flavor by reducing interaction with other components in the dessert. Additionally, the flavor dissolves the fat which coats the palate and throat in the form of water-immiscible fat droplets, prolonging the taste sensation.

One example of poor taste perception in a low-fat product is vanilla ice cream. Vanilla flavor rapidly disappears during storage of low-fat ice cream. This decrease in flavor intensity becomes noticeable to a trained panelist after just 24 hours of storage. Based on the literature, the mechanism for this flavor loss presumably involves high affinity binding of vanillin to starch and proteins, which requires prior partitioning of the vanillin into the aqueous phase. This hypothesis is consistent with the observation that decreasing the fat content of the ice cream greatly exacerbates the problem. As the fat content is reduced, more vanillin will move into the aqueous phase and bind with starch, ultimately decreasing flavor intensity.

Reduction in fat content not only decreases the available shelf-life of vanillin-containing ice cream, but it also affects flavor performance. Vanilla extract dissolved in an aqueous base gives a sudden burst of an unbalanced flavor perception with distinct off-notes that are absent in a fat base. Secondly, there is no lingering of the flavor in the mouth, since all of the vanillin is immediately dissolved in the saliva and swallowed as opposed to being coated to the palate.

Some producers have attempted to improve taste by using less reactive flavors. For example, ethylvanillin exhibits much lower affinity for starch and therefore has been used in Europe as a more stable artificial vanilla substitute in ice cream. However, use of ethylvanillin has several drawbacks. In comparison to vanillin, ethylvanillin is less balanced and not as full flavored. Furthermore, ethylvanillin may not be labelled as "natural" or "extract".

Therefore, further improvements are needed. It would be advantageous to have encapsulated flavor particles that protect the flavor in the product and then release the flavor upon consumption in the mouth. It would also be advantageous to have these particles liquify in the mouth and provide a balanced and lingering taste sensation. Furthermore, it would be desirable to have methods for preparing these particles.

SUMMARY OF THE INVENTION

This invention is directed to methods for preparing frozen flavor capsules and incorporating the capsules into frozen or refrigerated desserts. New flavor products and frozen desserts are also provided by this invention.

The method for preparing the frozen flavor capsules involves forming discrete composite capsules having a flavor encapsulated in an oil. The capsules are then frozen to solidify the oil and form discrete frozen solid flavor particles. The encapsulating oil must be essentially a liquid at ambient temperature, i.e., the temperature in the mouth. As used herein, "essentially a liquid" means either softened or molten. Thus, when a product containing these capsules is eaten, the oil liquifies and releases the encapsulated flavor. Preferably, the oil should essentially be a liquid at temperatures of about 30° C. and above.

In a preferred method of forming the flavor capsules, an emulsifier, such as a hydrophilic surfactant, is used to aid flavor release in the mouth. In another aspect of the method, the flavor is adsorbed onto a calcium silicate powder prior to encapsulation, thereby forming a flavor-silicate core complex to provide a longer lasting flavor release. Also, free flavor may be dissolved or dispersed in the outer oil shell of the capsules to give an initial flavor release and improve flavor perception. Once the capsules are formed, they are frozen by reducing the temperature to about 0° C. or below.

Another method of this invention involves flavoring frozen desserts, especially low-fat frozen desserts, using the above described frozen flavor capsules. With respect to the dessert products themselves, "frozen" means hardened or congealed by freezing or refrigerator temperatures. The flavor capsules made according to the invention are incorporated into the dessert in an effective flavor amount and protect the flavor in the dessert during freezing or refrigerated temperatures until ultimate flavor release in the mouth upon consumption. Because the oil is essentially a liquid at ambient temperature, the flavor capsules will melt in the mouth, releasing flavor from the oil shell and the central core of the capsule.

The desserts flavored by this method include ice cream, yogurt, ice milk and the like. The desserts may be formulated to contain low amounts of fat from about 0.1% to about 6% by weight with the perception of high fat content when eaten.

The objectives of this invention, its advantages and features will be further understood with reference to the following detailed description and specific examples to enable one with ordinary skill in the art to practice the invention.

DETAILED DESCRIPTION OF THE INVENTION

A variety of flavors may be encapsulated by the methods of the invention to form the high-impact, stable flavor capsules. These flavors include flavoring aromatic compounds and/or oils, oleoresins and extracts derived from plants, leaves, flowers, fruits and so forth, and combinations thereof. Flavor oils include cinnamon oil, oil of wintergreen, peppermint oil, bay oil, thyme oil, spearmint oil, cassia oil, and the like. Artificial, natural and synthetic fruit flavors such as vanilla, and citrus oils including lemon, raspberry, mandarin orange, orange, grapefruit, lime, and fruit essences including apple, pear, peach, strawberry, cherry, and so forth, may be used. These flavoring oils may be used individually or in a mixture as is well known in the art.

The oil encapsulation matrix may be made from a variety of oils or mixtures thereof. Any edible animal or vegetable oil that may be solidified or congealed upon freezing or refrigeration and that liquifies at ambient temperature in the mouth may be used. Specific examples of oils include cottonseed, corn, peanut, soybean, palm kernel, babassu, olive, and safflower.

The oil enrobement technique of this invention is a simple and economical approach to a very complex flavor delivery problem. It allows for easy separation of the flavor from the interfering ingredients and therefore greatly prolongs the useful shelf-life of a frozen dessert product. At the same time, it greatly improves the flavor performance in a no-fat or low-fat food by providing the physical conditions present in the high-fat food. In the case of vanilla ice cream flavored with vanilla extract, the method masks the phenolic, charcoal type off-notes, provides a high impact and increases the lingering sensation of the flavor. Furthermore, the flavor perception during product consumption is not affected in any negative way since the oil liquifies in the mouth without creating a waxy taste.

The method for preparing the frozen flavor capsules involves forming discrete composite capsules having a flavor encapsulated in an oil. The capsules are then frozen to solidify the oil and form discrete frozen solid flavor particles. The encapsulation shell mimics a high-fat food base by providing a hydrophobic micro-environment for the flavor. Due to this separate oil phase, the flavor is perceived as more balanced and lingering, similar to its original performance in a high-fat food. The encapsulating oil must be essentially a liquid at ambient temperature, i.e., the temperature in the mouth. As indicated above, "essentially a liquid" means either softened or molten. Thus, when a frozen or refrigerated product containing the capsules is eaten, the oil liquifies and releases the encapsulated flavor. Preferably, the oil should essentially be a liquid at temperatures of about 30° C. and above.

In a preferred method of forming the flavor capsules, an emulsifier, such as a hydrophilic surfactant, is added to the oil. The emulsifier aids flavor release and performance in the mouth by emulsifying the capsules into the saliva. In another aspect of the preferred method, the free flavor is adsorbed onto a calcium silicate powder prior to encapsulation, thereby forming a flavor-silicate complex. This complex forms a distinct solid core inside the oil shell and enhances the duration of the flavor sensation by providing a longer lasting flavor release. If desired, free flavor also may be dissolved or dispersed in the outer oil shell itself. The free flavor added to the shell increases the initial flavor impact because it is available for immediate emulsification in the mouth as the oil liquifies.

Once the capsules are formed, they are frozen by reducing the temperature to about 5° F. or below. The capsules require these freezing manufacturing conditions in order to prevent tackiness and to assure product flowability. If desired, these finished capsules may be stored in a freezer for as long as six months. The capsules should be kept at temperatures below about 30° F., and preferably 20° F., in order to prevent tackiness and maintain product flowability.

The invention also involves the method of flavoring frozen desserts using the inventive frozen flavor capsules. With respect to the dessert products themselves, "frozen" means hardened or congealed by freezing or refrigerator temperatures, which typically are temperatures at or below about 40° F., and preferably below about 20° F., depending upon the oil used in the encapsulation. Flavor performance and flavor loss during shelf-life occur in many types of frozen low-fat desserts, such as ice cream, yogurt and ice milk. Oil enrobement improves the flavor performance and extends the shelf-life of all such low-fat chilled products, which may be formulated to contain low amounts of fat from about 0.1% to about 6% by weight. Furthermore, while vanillin loss is particularly pronounced in low-fat desserts, a gradual decrease in flavor intensity also occurs in such full-fat dessert products. When the inventive flavor capsules are used in these full-fat desserts, they reduce flavor loss by limiting the mobility of the flavor into the aqueous phase with subsequent adsorption onto starch. Therefore, encapsulation of flavor may be used to extend the shelf-life of full-fat dessert products as well. Once the capsules have been incorporated into the dessert products, these products must be kept at temperatures of about 40° F. and below.

The following examples illustrate the practice of this invention as well as the performance of products using the invention. However, these examples are not intended to limit the scope of the invention.

EXAMPLE I

Preparation of Vanilla Flavor Capsules Using Best Mode

First, the flavor-silicate powder complex was prepared by adsorbing or plating an alcoholic vanilla extract onto a fine calcium silicate powder having an average particle size of about three microns. One part calcium silicate powder was blended manually with three parts, by weight, of vanilla extract until the mixture resulted in a free-flowing powder. On a larger scale, the plating may be carried out in a ribbon blender.

Next, the oil material, also known as encapsulation matrix, was prepared by blending, at about 100° F. to 120° F., solid shortening with melting point of about 93° F. to about 96° F. with one part palm oil with melting point of about 70° F. to about 75° F. In addition, 3% of the hydrophilic emulsifier Tween 80 (a polyoxyethylene derivative of fatty acid partial esters of sorbitol anhydrides) was added to the melted oil. This mixture was stirred and maintained at about 100° F. to about 120° F. until used for encapsulation.

Then the components were mixed together in preparation for flavor encapsulation. 10 grams of the free vanilla extract and 20 grams of the flavor-silicate powder complex were added to 70 grams of the encapsulation matrix. The mixture was stirred vigorously and then emulsified by sonification for 10 seconds. Fat encapsulation was performed using a rotating disk. The disk was heated to 120° F. to maintain the flavor-fat emulsion in a fluid state. The mixture was poured onto the heated rotating disk, and the capsules were cooled to 0° F. by placing the encapsulation equipment into a chilled chamber. The capsules completely solidified within a few seconds of production and were collected as a free-flowing powder and stored in a glass jar in the freezer.

EXAMPLE II

Preparation of the Inventive Ice Cream Product, and Taste Test Comparing Ice Creams With and Without the Inventive Flavor Capsules The flavor performance of the inventive capsules in low-fat ice cream was compared to free flavor dissolved in both low-fat and full-fat ice cream by sensory evaluation. The level of vanilla extract was maintained constant at 0.25% in all three products (the concentration of the encapsulated vanilla was adjusted to achieve the same level of active materials).

Full-fat and low-fat (2%) ice creams were prepared using an Ott freezer. The dry ingredients were pre-weighed and blended, and this dry mix was added to a cream and milk mixture. The new mixture was stirred for three minutes with a lightening mixer at high speed, and allowed to set for five minutes. The mixture then was restirred for three minutes, and allowed to set overnight in a refrigerator. After setting overnight, the product was restirred. 2.7 liters of the product were poured into, the hopper funnel of the Ott freezer. With the freezer door closed, the product was mixed by turning on the agitator. The product was refrigerated for fifteen minutes, and then removed from the freezer compartment.

| Ingredient | Composition: | |
|---|---|---|
| | Low-Fat Ice Cream (2% Fat) | High-Fat Ice Cream (15% Fat) |
| Heavy cream (36% fat) | 1.40% | 39.09% |
| Milk (2% fat) | 82.10% | 44.41% |
| Sugar | 14.00% | 14.00% |
| Na-CMC, MicroQuick WC-595 (from FMC) | 2.00% | 2.00% |
| Ground spent vanilla beans | 0.25% | 0.25% |
| Guar gum | 0.10% | 0.10% |
| Salt | 0.08% | 0.08% |
| Carrageenan, type L-100 (from Hercules) | 0.07% | 0.07% |

Next, the inventive flavor capsules were added to a portion of the low-fat ice cream.

The overrun of the ice cream was measured by weighing 1000 ml of the ice cream mix and of finished ice cream and was calculated according to the following formula:

$$\text{Overrun} = 100 \times \frac{\text{weight of mix} - \text{weight of ice cream}}{\text{weight of ice cream}}$$

The amount of overrun in all ice cream samples was maintained constant at 90.0%±5.0%.

Then the three products were compared by a professional taste panel consisting of ten participants. A moderator first trained the panel in vanilla flavor analysis and then led the discussion to obtain a descriptive sensory analysis. The results were summarized in the form of a qualitative sensory report.

The results demonstrate that the flavor performance of free vanilla extract is extremely base dependent. In the full-fat ice cream, the free vanilla extract exhibited a balanced flavor release with a lingering impact. In the low-fat ice cream, however, the delayed and long-lasting sensation was completely replaced with a sudden and sharp release of a different flavor profile that contained many phenolic charcoal-type off-notes.

Meanwhile, the low-fat ice cream incorporating the inventive flavor capsules closely mimicked the flavor perception of the high-fat vanilla ice cream. The capsules restored the longevity of the release, and masked the off-notes, presumably by creating a hydrophobic microenvironment around the flavor that has properties similar to those of a high-fat ice cream base.

The inventive capsules also were incorporated into a no-fat ice cream and compared with a no-fat ice cream using free flavor. In the free flavor ice cream, the flavor was completely distorted and organoleptically unacceptable. In the inventive product, however, the capsules dramatically improved the mouth feel and texture of the finished ice cream.

EXAMPLE III

Comparison of Shelf-life Stability of the Flavor Capsules and Free Flavor in Low-fat Ice Cream The shelf-life stability of free vanilla extract was compared to that of encapsulated extract by dividing a 5 lb batch of 2% low-fat ice cream into 2 parts, blending the two flavors into the 2 aliquots separately, and storing the products in a temperature cycling freezer under accelerating storage test conditions for up to 6 months. The vanilla intensity of the two vanilla ice cream products was scored in duplicate by the above 10 panelists after the following time intervals: 0, 1, 2, 4, 9. 17, and 26 weeks.

The flavor capsules significantly outperformed the free flavor. While the flavor intensity of the free flavor dessert decreased by 40% over the first fourteen days, there was no significant change in the encapsulated product for a period of five weeks or more.

EXAMPLE IV

Different Formulations of the Frozen Flavor Capsules

A. Alcoholic vanilla extracts. Several vanilla extracts were tested, including Superbean extract, a Bourbon extract, a Bali extract, a Tahitian extract, and a K extract. No difference in performance and processability was observed.

B. Other physical forms of vanilla flavors. An artificial vanilla powder (mainly ethylvanillin), an oleoresin, and an artificial vanilla flavor in alcohol (propylene glycol (1:1)) also were tested. Straight emulsions were prepared without prior plating onto a calcium silicate powder. Capsules were prepared by disk rotation using payloads of 20% to 30%. Oleoresin slightly depressed the overall melting point of the capsules and thereby caused stickiness during processing at high payloads. Otherwise, the capsules performed well.

C. Melting point of shell material. The ratio of solid shortening (with melting point of about 93° F. to about 96° F.) to palm oil (with melting point of about 70° F. to about 75°) was varied from 3:1 to 1:1. At a ratio of less than 2:1, some tackiness of the capsules was observed under the test conditions. Too much softening impaired the processability, even at a temperature as low as 0° F.

D. Hydrophobic emulsifiers. In some cases, 0.5% to 1.0% of Span 60 was added to aid emulsification of the flavor into the shell material during processing. This ingredient had no noticeable effect on the finished product's performance.

E. Hydrophilic emulsifiers. The addition of 1% to 3% Tween 80 to the shell material substantially increased the flavor impact of the finished capsules when tasted in ice cream containing 2% fat. It is likely that this hydrophilic emulsifier accelerates the emulsification of the capsules into the saliva during consumption, thereby aiding flavor release. The best mode example contains 3% of Tween 80.

F. Loading. Due to the positive effect of fat encapsulation on both flavor performance and mouth-feel, it was hypothesized that decreasing the percent loading (that is, the percent actives by weight) would increase the benefit. However, no difference in performance was observsd between two encapsulated vanilla extracts with loadings of 10% and 30%.

G. Omission of calcium silicate powder. When the alcoholic vanilla extract was encapsulated without prior plating onto the calcium silicate powder, a satisfactory product was obtained. However, there was less masking of the phenolic off-notes and also less of a flavor lingering. Overall, the quality of this product was less than if the extract was first plated onto the calcium silicate powder. In a similar example, the alcoholic extract was diluted with 5 volumes of water to make it immiscible with the shell. When this aqueous vanilla solution was encapsulated to produce a micromatrix, a product with objectionable flavor performance was obtained, similar to that of the neat extract without any encapsulation. This experiment led to the conclusion that it is essential to partition the vanilla flavor into a hydrophobic phase that remains like that upon consumption. In the case of water droplets suspended in the fat capsules, the microenvironment of the encapsulated vanilla resembles that of a straight low-fat ice cream base and therefore behaves accordingly.

H. Omission of vanilla extract from shell. When the small amount of vanilla extract was omitted from the shell material in the above best mode example, a slightly inferior product was obtained. In this case all of the flavor was plated onto the calcium silicate powder and rendered immobilized in the core of the capsule. Such a product has a slightly less sweet and less balanced flavor, since all of the flavor must be desorbed during consumption. The best mode example provides a desirable balance between upfront impact and lingering sensation, which greatly improves the overall flavor perception.

EXAMPLE V

Comparison of Fruit-flavored Ice Creams Using the Inventive Flavor Capsules Versus the Free Oil A mandarin orange oil was encapsulated with 72.75% solid shortening (with melting point of about 93° F. to about 96° F.), 24.25% palm oil (with melting point of about 70° F. to about 75° F.) and 3% Tween 80, with a 10% loading. The base used was an ice cream containing 2% fat. The encapsulated flavor increased the lingering sensation and masked the chemical and bitter off-notes in comparison to the ice cream containing the free oil.

A similar experiment was conducted using different formulations of encapsulated raspberry oil. The different formulations included:

1) A raspberry oil encapsulated with 72.75% solid shortening (with melting point of about 93° F. to about 96° F.), 24.25% palm oil (with melting point of about 70° F. to about 75° F.) and 3% Tween 80, with 30% loading;
2) a spray-dried raspberry oil encapsulated with 72.75% solid shortening (with melting poing of about 93° F. to about 96° F.), 24.25% palm oil (with melting point of about 70° F. to about 75° F.) and 3% Tween 80, with 30% loading; and
3) raspberry oil diluted with propylene glycol (1 part oil and 4 parts propylene glycol) encapsulated with 72.75% solid shortening (with melting point of about 93° F. to about 96° F.), 24.25% palm oil (with melting point of about 70° F. to about 75° F.) and 3% Tween 80, with 15% loading.

All three raspberry encapsulates performed well despite their different physical properties, however, the spray-dried raspberry oil performed the best. In formula (1), the oil was dissolved and equally distributed through the capsules, while in (2), the flavor formed a solid core surrounded by a fat shell. In formula (3), the oil was suspended in the capsule in the form of many tiny propylene glycol droplets (a micromatrix).

When tasted in low-fat ice cream, the encapsulated raspberry samples masked the chemical off-notes present in the free oil and prolonged the tasting perception compared to the free oil ice cream product.

EXAMPLE VI

Comparison of Shelf-Life Stability of the Flavor Capsules and Free Flavor in Refrigerated Yogurt The yogurt was prepared by adding 0.04% aspartame to a no-fat yogurt base. Then 0.025% free vanilla extract was added to one batch and 0.1% encapsulated vanilla extract was added to another batch.

In a taste test with six panelists, the yogurt incorporating the flavor capsules was preferred significantly due to the flavor quality and the lingering vanilla sensation. The products then were stored at 40° F. for four weeks and evaluated weekly by the same sensory panel until the completion of the storage study. At each time point, the test sample had a much higher vanilla intensity and a more balanced flavor than the control, with the difference being largest after four weeks.

The invention is not limited to the examples discussed above, but on the contrary, is intended to cover various modifications and equivalent arrangements included within the spirit and scope of the appended claims.

What is claimed is:

1. A method for preparing frozen flavor capsules comprising encapsulating flavor particles in a liquid oil at ambient temperature to form discrete composite capsules of flavor particles in an outer liquid oil shell, and freezing said discrete capsules to solidify said outer liquid oil shell around said flavor particles to form discrete frozen solid flavor capsules, whereby said flavor particles are stabilized in said discrete frozen solid flavor capsules and are available for release in the mouth upon consumption.

2. The method of claim 1 wherein encapsulation is at temperatures of about 100° F. to about 120° F.

3. The method of claim 1 further comprising the step of adding an emulsifier to the oil.

4. The method of claim 3 wherein said emulsifier is a hydrophilic surfactant.

5. The method of claim 1 wherein said flavor is adsorbed onto a calcium silicate powder prior to encapsulation.

6. The method of claim 1 wherein a portion of said flavor particles is dispersed in the liquid oil prior to freezing to provide an initial flavor release upon consumption and improved overall flavor perception.

7. The method of claim 1 wherein said capsules are frozen by reducing the temperature to about 5° F. or below.

8. The frozen flavor capsules produced by the method of claim 1.

9. A method of flavoring low-fat frozen desserts comprising encapsulating flavor particles in a liquid oil at ambient temperature to form discrete composite capsules of flavor particles in an outer liquid oil shell, freezing said discrete capsules to solidiify said outer liquid oil shell around said flavor particles to form discrete frozen solid flavor capsules, and incorporating said frozen solid flavor capsules into a low-fat frozen dessert in an effective flavor amount, said capsules protecting said flavor particles in said frozen dessert for flavor release in the mouth upon consumption.

10. The method of claim 9 wherein said low fat frozen dessert is selected from the group consisting of ice cream, yogurt and ice milk.

11. The method of claim 9 wherein said low-fat frozen dessert contains from about 0.1% to about 6% fat by weight.

12. The low-fat frozen desserts produced by the method of claim 9.

13. A method of flavoring low-fat ice cream comprising encapsulating flavor particles in a liquid oil at ambient temperature to form discrete composite capsules of flavor particles in an outer liquid oil shell, freezing said discrete capsules to solidify said outer liquid oil shell around said flavor particles to form discrete frozen solid flavor capsules, and incorporating said frozen solid flavor capsules into a low-fat ice cream in an effective flavor amount, said capsules protecting said flavor particles in said ice cream for flavor release in the mouth upon consumption.

14. The method of claim 13 further comprising the step of adding an emulsifier to the oil.

15. The method of claim 14 wherein said emulsifier is a hydrophilic surfactant.

16. The method of claim 13 wherein encapsulation is at temperatures of about 100° F. to about 120° F.

17. The method of claim 13 wherein said flavor is adsorbed onto a calcium silicate powder prior to encapsulation.

18. The method of claim 13 wherein a portion of said flavor particles is dispersed in the liquid oil prior to freezing to provide an initial flavor release upon consumption and improved overall flavor perception.

19. The method of claim 13 wherein said capsules are frozen by reducing the temperature to about 5° F. or below.

20. The low-fat ice cream produced by the method of claim 13.

* * * * *